(12) United States Patent
Csibi et al.

(10) Patent No.: US 10,104,745 B2
(45) Date of Patent: Oct. 16, 2018

(54) POWER HANDLING SYSTEM AND METHOD

(71) Applicant: General Electric Company, Schenectady, NY (US)

(72) Inventors: Lajos Csibi, Budapest (HU); Jeno Balazs, Budapest (HU); Richard Boros, Budapest (HU); Tamas Daranyi, Budapest (HU); Gabor Pap, Budapest (HU)

(73) Assignee: General Electric Company, Schenectady, NY (US)

( * ) Notice: Subject to any disclaimer, the term of this patent is extended or adjusted under 35 U.S.C. 154(b) by 190 days.

(21) Appl. No.: 15/073,991

(22) Filed: Mar. 18, 2016

(65) Prior Publication Data

US 2017/0273158 A1 Sep. 21, 2017

(51) Int. Cl.
*H02J 7/00* (2006.01)
*H05B 37/02* (2006.01)
*H02J 7/34* (2006.01)

(52) U.S. Cl.
CPC ........ *H05B 37/0209* (2013.01); *H02J 7/0068* (2013.01); *H02J 7/345* (2013.01)

(58) Field of Classification Search
USPC .......................................................... 307/20
See application file for complete search history.

(56) References Cited

U.S. PATENT DOCUMENTS

| 6,762,570 B1 | 7/2004 | Fosler | |
| 6,965,637 B2 | 11/2005 | Davis | |
| 7,167,777 B2 | 1/2007 | Budike | |
| 7,598,631 B2 | 10/2009 | Szabados | |
| 8,694,817 B2 | 4/2014 | Hoffknecht | |
| 8,755,944 B2 | 6/2014 | Elliott | |
| 8,996,733 B2 | 3/2015 | Zueger | |
| 2004/0140777 A1* | 7/2004 | Fosler | H05B 37/0254 315/363 |
| 2008/0183337 A1 | 7/2008 | Szabados | |
| 2008/0258551 A1* | 10/2008 | Chitta | H04L 25/028 307/3 |
| 2015/0137684 A1 | 5/2015 | Hartman | |
| 2015/0187528 A1* | 7/2015 | Elberbaum | H01H 51/27 361/195 |

FOREIGN PATENT DOCUMENTS

| CN | 101184353B B | 5/2011 |
| EP | 1374366 B1 | 11/2005 |
| WO | 2011023140 A1 | 3/2011 |

* cited by examiner

*Primary Examiner* — Rexford Barnie
*Assistant Examiner* — Xuan Ly
(74) *Attorney, Agent, or Firm* — Peter T. DiMauro; GPO Global Patent Operation

(57) ABSTRACT

A power handling system of a digitally addressable lighting interface (DALI) system controls switches connected with a bus of the DALI system that powers lower power light sources. A power supply circuit receives energy conducted on the bus to the lower power light sources and conducts at least part of the energy to a capacitor. Electric energy is stored in the capacitor until the capacitor stores at least a designated threshold of input voltage of a controller. The capacitor powers the controller to close one or more switches using at least some of the stored electric energy.

20 Claims, 4 Drawing Sheets

POWER HANDLING SYSTEM AND METHOD

FIELD

Embodiments of the inventive subject matter described herein relate to circuit assemblies used to control electrically powered devices, such as loads connected with a lighting system.

BACKGROUND

Some electrical systems include controllers that control operations of other devices. Some of these systems can be lighting systems having a controller that communicates with light sources for controlling which light sources are activated or deactivated. The systems may include separate pathways or wires for supplying current to the light sources for powering the light sources and communicating with the light sources. One example of such a system is a digitally addressable lighting interface (DALI) system. The DALI system may include a controller that controls operation of light drivers to control corresponding light sources. The drivers may be powered from an electrical grid (e.g., an alternating current grid, such as a utility grid). The controller can control operation of the light drivers by communicating control signals over a control bus. The control bus and the voltage lines (through which current is supplied from the grid to power the drivers) are separate pathways. As a result, the power consumption of the drivers and light sources from the grid does not have an impact on the load on the control bus.

If a DALI system is to include one or more devices that cannot be powered by an electrical grid or another separate, external power source, these devices may need to be powered by the control bus of the DALI system. But, because the control bus may be limited in the amount of power it can supply (e.g., 250 milliamps or less of turnover current), the amount of current that can be supplied to the devices is limited. As a result, the number of these devices that can be included in the DALI system may be limited (e.g., to two devices or less), or the devices may only be able to operate on very limited amounts of power from the DALI control bus.

Consequently, devices such as incandescent light sources, light sources having tungsten filaments, or other devices (e.g., other than light sources) may not be connected directly with the DALI lighting system. There can be a need for power (e.g., a mains bus) for powering lights, air conditioning, or other high loads that are controlled by the DALI lighting system, a digital control circuit (e.g., that interfaces with the DALI lighting system) to be able to communicate with the central controller device of the DALI lighting system and controls the relays, and/or additional power to be supplied from the mains bus for powering the control circuit. The additional power may be needed because switching high loads from a low power digital bus can require expensive high current relays with an alternating current mains bus providing the power to the relays or two or more relay stages that can be expensive and complicated or impossible in some cases.

BRIEF DESCRIPTION

In one embodiment, a power handling system and method are provided to allow a high current relay to be switched on or off with a small amount of current supplied by a digitally addressable interface (DALI) lighting system. The relay can be switched on to cause a higher power load (e.g., a load that could not be powered by the DALI lighting system) to be activated. The higher power load may be powered by another power source, such as a utility grid, that supplies a larger amount of voltage and/or current (e.g., 110 volts/230 volts AC) than is provided by the DALI lighting system. This allows for the higher power loads to be more easily connected with the DALI lighting system in that additional wires or buses may not be needed (or very few additional wires or buses are needed), and may allow for IEC class II safety separation for appliances.

A controller of the power handling system can be powered only from the control bus of the DALI lighting system in one embodiment. This can ensure that the power consumption of the controller remains below a predefined limit (e.g. 2 milliamps of current, which is the standard DALI power consumption), and yet capable to switch one or more independent heavy electric loads on independent mains supplies at a nominal switching rate of 2 times per second (or another rate). The mains power that supplies current to these heavier loads can be connected only to the galvanically separated switching contact of one of the switching relays of the controller so that the controller is not powered by this additional power supply.

In one embodiment, a power handling system includes a controller and a power supply circuit. The controller is configured to control one or more switches connected with a bus (e.g., a control bus) of a digitally addressable lighting interface (DALI) system that supplies an electric current to one or more lower power light source drivers, the controller configured to close the one or more switches to activate and/or deactivate one or more higher power devices (or to conduct at least some of the current conducted on the bus of the DALI system to the higher power devices). The power supply circuit is operably coupled with the controller and the bus of the DALI system. The power supply circuit includes a power supply capacitor and is configured to receive at least part of the current conducted on the bus to the one or more lower power light source drivers. The power supply circuit also is configured to conduct at least part of the current to the power supply capacitor. The power supply circuit also is configured to store electric energy of the at least part of the current in the power supply capacitor until the power supply capacitor stores at least a designated upper threshold of input voltage of the controller. The power supply capacitor is configured to discharge at least some of the electric energy that is stored in the power supply capacitor into the controller to power the controller to close the one or more switches using at least some of the electric energy stored in the power supply capacitor responsive to the power supply capacitor storing at least the designated upper threshold of the input voltage of the controller. In one aspect, the power supply circuit can power the one or more higher power devices using the current conducted on the bus.

In one embodiment, a method includes receiving a current conducted along a bus of a digitally addressable lighting interface (DALI) system that supplies the current to one or more lower power light sources drivers (e.g., ballasts). The current is received by a power supply circuit. The method also includes conducting at least part of the current conducted on the bus to a power supply capacitor of the power supply circuit, storing electric energy of the at least part of the current in the power supply capacitor until the power supply capacitor stores at least a designated upper threshold of input voltage of the controller, and, responsive to the power supply capacitor storing at least the designated upper threshold of the input voltage of the controller, discharging at least some of the electric energy that is stored in the power supply capacitor into a controller to power the controller and cause the controller to close one or more switches connected with one or more higher power devices to activate the higher power devices with the current conducted on the bus.

In one embodiment, a DALI power handling system includes a rectifier configured to be operably coupled with a bus of a DALI lighting system that supplies an electric current to one or more light source drivers, a receiver and transmitter circuit configured to be operably coupled with the rectifier to receive a control signal conducted along the bus of the DALI lighting system, a controller (e.g., an internal controller), and a power supply circuit. The controller is configured to be operably coupled with the receiver and transmitter circuit. The controller can be configured to control one or more switches to conduct at least some of the current conducted on the bus to one or more devices that operate on greater loads than the one or more light source drivers. The power supply circuit is configured to be operably coupled with the controller and the rectifier. The power supply circuit can be configured to receive at least part of the current conducted on the bus and to store electric energy based on the at least part of the current that is received by the power supply circuit. The power supply circuit can be configured to discharge at least some of the electric energy that is stored in the power supply circuit into the controller to power the controller to change a state of the one or more switches.

BRIEF DESCRIPTION OF THE DRAWINGS

Reference is now made briefly to the accompanying drawings, in which.

DETAILED DESCRIPTION

Figure 1:
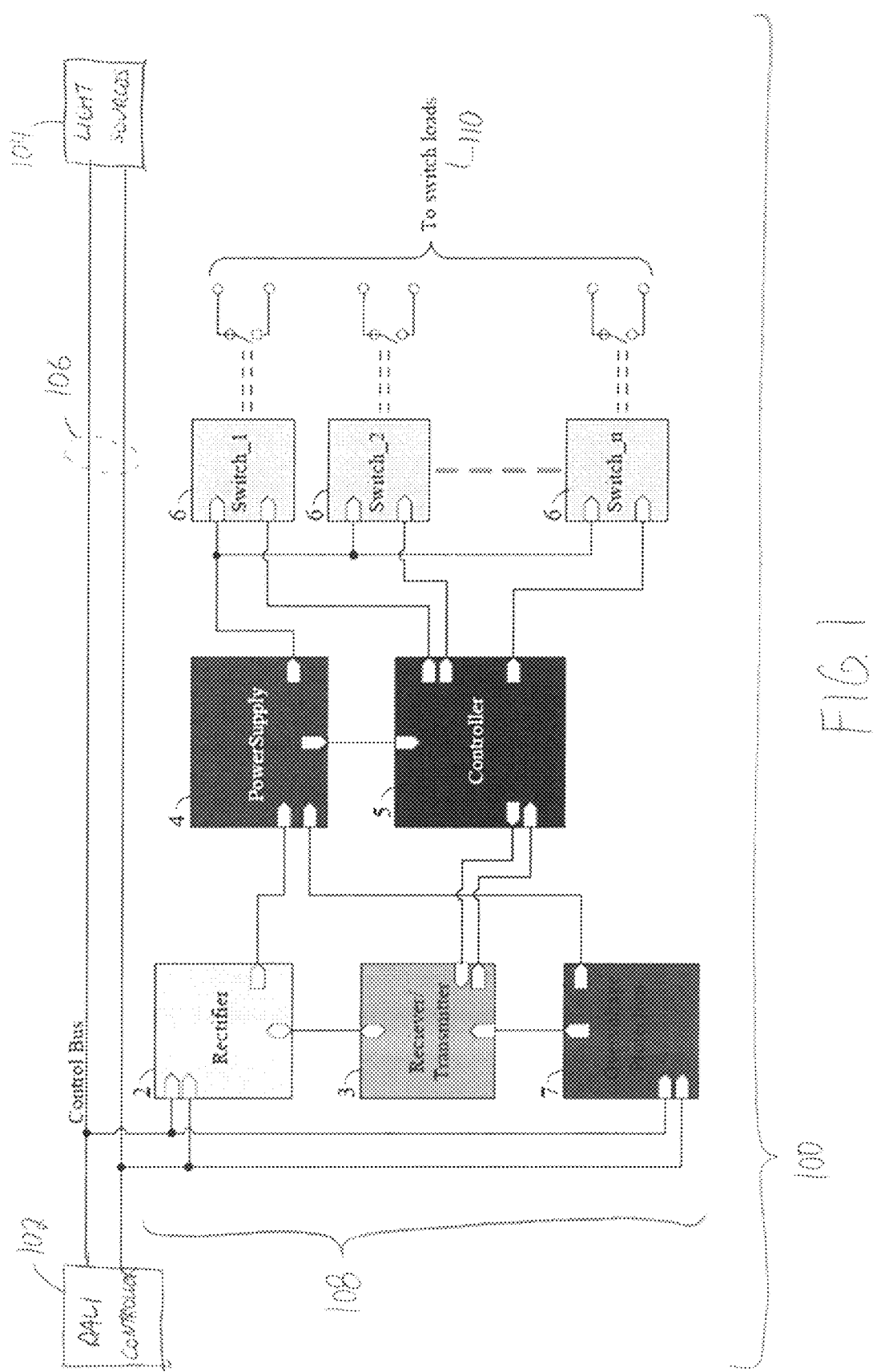
FIG. 1 illustrates a lighting system having a power handling system according to one example.

FIG. 1 illustrates a lighting system 100 having a power handling system 102 according to one example. The lighting system 100 includes a lighting controller 102 (e.g., "DALI controller" in FIG. 1) that controls operation of one or more low or lower power light sources 104. The controller 102 can represent hardware circuitry that includes and/or is connected with one or more processors (e.g., microcontrollers, microprocessors, field programmable gate arrays, integrated circuits, etc.). The light sources 104 may represent one or more LEDs or other types of light sources that operate on reduced amounts of current, such as less than 20 milliamps, less than 10 milliamps, or the like, and/or on reduced amounts of power, such as less than 10 milliwatts, less than 5 milliwatts, etc. The lighting system 100 can schematically represent a DALI lighting system. The light sources 104 shown in FIG. 1 also may represent drivers of the light sources 104. The lighting system 100 includes conductive buses 106 ("Control Bus" in FIG. 1) for conducting control signals from the controller 102. The buses 106 may be referred to as a control bus. The light sources 104 may be powered by current conducted from a power supply on the same control bus 106 or via other conductive pathways. The light sources 104 may be individually controlled by the controller 102. For example, each light source 104 may be digitally addressed by the controller 102 so that the controller 102 can individually control which light source 104 is turned on or off.

A power handling system 108 can be connected with the bus 106 of the lighting system 100 to control several higher power loads 110 ("switch loads" in FIG. 1). The loads 110 may be devices that are powered by more current and/or power than the light sources 104. For example, the loads 110 can represent incandescent lights, lights having tungsten filaments, fans, refrigerators, other appliances, or other devices. The loads 110 can be controlled by current conducted on the bus 106. For example, control signals can be communicated from the controller 102 to the power handling system 108 to control the loads 110, such as by turning the loads 110 on or off.

In one embodiment, the power handling system 108 is powered by the current conducted on the control bus 106, and does not require any additional or auxiliary power source. This can reduce the cost and complexity of the lighting system 100. The power handling system 108 consume low amounts of power, such as less than 10 milliwatts or another amount. As a result, the power handling system 108 can operate within the limited current conducted along the control bus 106. Even with the relatively small amounts of electric power used to control and power the system 108, the system 108 can switch (e.g., turn on or off) the loads 110, which can consume several kilowatts of energy with significant inrush of current into the lighting system 100. In one embodiment, the loads 110 can be fully or at least partially powered by the current conducted along the bus 106. The power handling system 108 includes several switches 6 that are opened or closed to control conduction of current to the loads 110. The power handling system 108 can store the states of the switches 6 (e.g., open or closed) in a memory of the power handling system 108 (e.g., which may be included in an internal controller 5 of the power handling system 108 or separate from the internal controller 5), so that the states can be obtained after a power loss. Several switch loads 110 can be connected with the power handling system 108, such as 63 per channel or per system 108.

The power handling system 108 includes a rectifier 2 that is operably coupled with the bus 106 of the lighting system 100. For example, the rectifier 2 can be conductively coupled with the bus 106 that conducts an electric current to the light sources 104. The rectifier 2 can modify the current conducted on the bus 106 by converting an alternating current conducted on the bus 106 to a direct current. A receiver and transmitter circuit 3 ("Receiver/Transmitter" in FIG. 1) of the system 108 is operably coupled with the rectifier 2. For example, the receiver and transmitter circuit 3 can be conductively coupled with the rectifier 2. The circuit 3 receives control signals conducted along the bus 106 of the lighting system 100 via the rectifier 2. For example, a control signal conducted along the bus 106 may be conveyed to the receiver and transmitter circuit 3 via the rectifier 2. The receiver and transmitter circuit 3 represents hardware circuitry that conducts signals to and/or from the controller 102 of the lighting system 100. Overvoltage protection circuitry 7 represents one or more hardware circuits that protect the components of the system 108 from overvoltages (e.g., voltages exceeding a designated limit) conducted into the system 108 via the bus 106. The circuitry 7 can include resistors, switches, etc. for preventing overvoltages from reach and/or damaging the components of the system 108.

A power supply circuit 4 is operably coupled with the rectifier 2 and optionally with the overvoltage protection circuit 7. The power supply circuit 4 receives at least part of the current conducted on the bus 106 via the rectifier 2. For example, the direct current that is output from the rectifier 2 can be conducted to the power supply circuit 4. The power supply circuit 4 also may be connected with the overvoltage protection circuit 7. An internal controller 5 is operably coupled with the power supply 4, the receiver and transmitter circuit 3, and the switches 6. The internal controller 5 can represent hardware circuitry that includes and/or is connected with one or more processors (e.g., microcontrollers, microprocessors, integrated circuits, field programmable gate arrays, etc.). As described below, the power supply circuit 4 may store electric energy based on the current that is received by the power supply circuit 4 and discharge at least some of this electric energy that is stored in the power supply circuit 4 into the internal controller 5. This discharged current powers the internal controller 5. The internal controller 5 may then change a state of one or more of the switches 106. The internal controller 5 can receive a control signal from the controller 102 via the bus 106 and the receiver and transmitter circuit 3. This control signal can identify which switches 6 are to change state (e.g., from a closed state to an open state or vice-versa) to change which loads 110 are powered and which loads 110 are not powered. Based on this signal, the internal controller 5 can control the states of the switches 6. In one embodiment, the switches 6 that are closed can conduct the current that is conducted on the bus 106 (and optionally rectified by the rectifier 2) to the loads 110 to power the loads 110.

Figure 2:
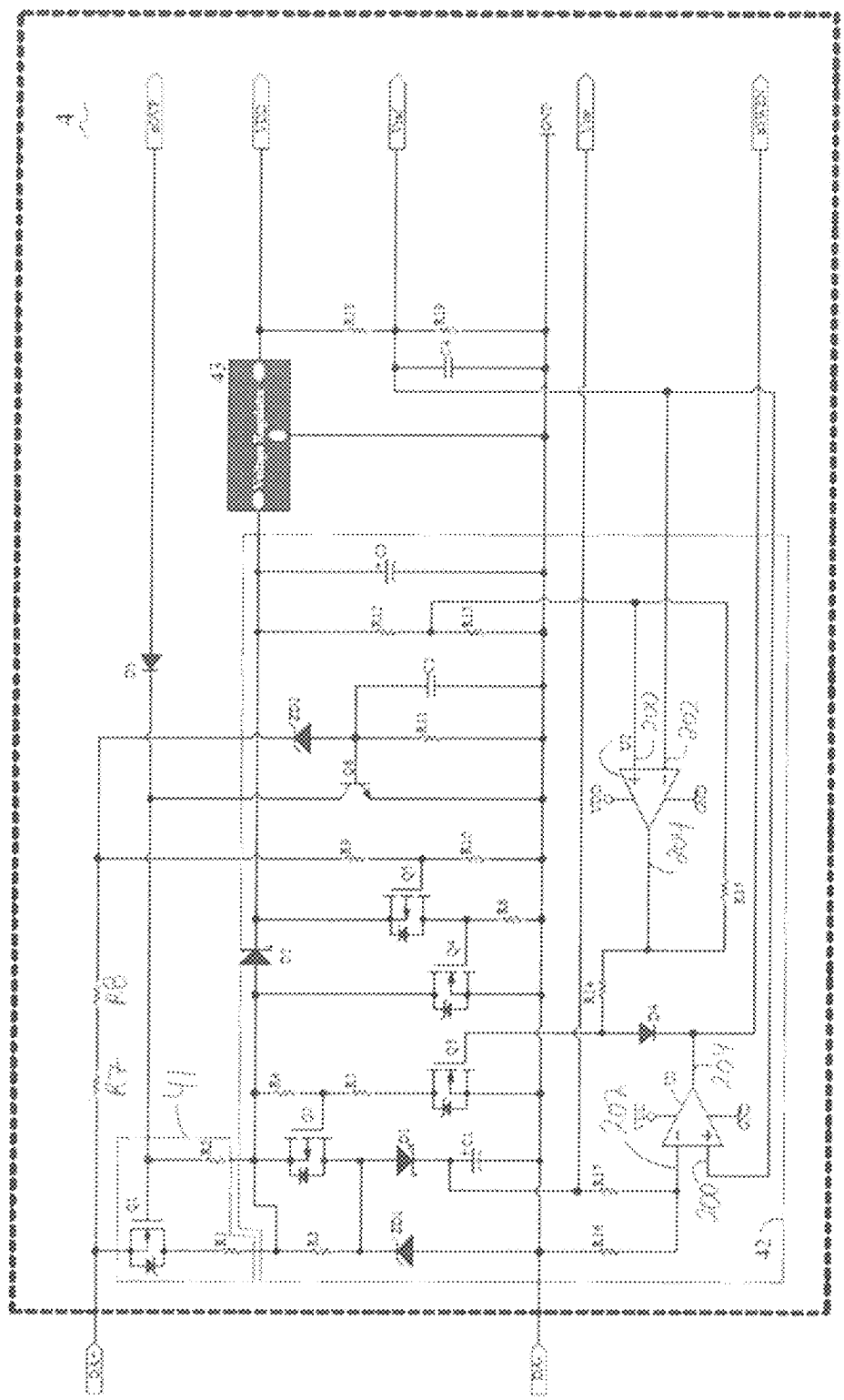
FIG. 2 is a circuit diagram of the power supply circuit shown in FIG. 1 according to one embodiment.

FIG. 2 is a circuit diagram of the power supply circuit 4 shown in FIG. 1 according to one embodiment. The power supply circuit 4 includes conductive terminals DA+, DA− that are coupled with the rectifier 2 shown in FIG. 1 to receive current from the bus 106 shown in FIG. 1 via the rectifier 2. A source of a solid state semiconductor switch Q1 is conductively coupled with the terminal DA+. This switch Q1 can represent an n-type metal oxide semiconductor field effect transistor, or MOSFET. In one embodiment, the switch A1 is a high voltage depletion type nMOSFET. Alternatively, the switch Q1 can represent another type of switch. Plural resistors R7, R8 are conductively coupled in series with each other and with the terminal DA+. The terminal DA− is conductively coupled with a ground reference GND of the circuit 4. Several legs of the circuit 4 extend from the terminal DA+ to the reference GND, as shown in FIG. 2. One leg of the circuit 4 includes the switch Q1 connected with a resistor R1 (with the resistor R1 connected with the drain of the switch Q1), a resistor R3, and a diode ZD1, such as a Zener diode. The resistor R1 also is connected with a cathode of the diode ZD1. The resistor R1 may be referred to as a current sense resistor.

A resistor R2 is connected with a gate of the switch Q1 and with a drain of the switch Q2. The resistor R2 may be referred to as a feedback resistor. A diode D1 is connected with a source of the switch Q2, with the anode of the diode D1 connected with the source of the switch Q2 and a cathode of the diode D1 connected with a capacitor C1, which may be referred to as a power supply capacitor. The diode D1 may be a Schottky diode or another type of diode. As described herein, the capacitor C1 can store electric energy that is discharged to the internal controller 5 to power the internal controller 5. The capacitor C1 also is connected with the ground reference GND. Resistors R4, R5 are connected in series with each other, with a gate of the switch Q2 connected with the resistors R4, R5 in a location that is between the resistors R4, R5. The resistor R5 is connected with a drain of a solid state semiconductor switch Q3, such as an n-type MOSFET. A source of the switch Q3 is connected with the ground reference GND.

A voltage regulator 43 is connected with the terminals DA+, DA− in a location between the terminals DA+, DA−. The voltage regulator 43 can include a DC-DC converter in one embodiment. The voltage regulator 43 stabilizes the current conducted in the power supply circuit 4 so that the voltage of the current does not vary (e.g., by more than a designated threshold, such as 1%, 3%, or the like). A diode D2 is connected with the terminals DA+, DA− in a location between the terminals DA+, DA−. The diode D2 also is connected with the voltage regulator 43 between the terminals DA+, DA− and the voltage regulator 43. An anode of the diode D2 is connected with the terminals DA+, DA− in a location between the terminals DA+, DA− and a cathode of the diode D2 is connected with the voltage regulator 43.

A solid state semiconductor switch Q4 is in another leg of the circuit 4 between the terminal DA+ and the ground reference GND, as shown in FIG. 2. The switch Q4 may be a p-type MOSFET. A drain of the switch Q4 is connected with the anode of the diode D2 and a source of the switch Q4 is connected with the ground reference GND. A gate of the switch Q4 is connected with a source of another solid state semiconductor switch Q5, such as an n-type MOSFET in another leg of the circuit 4. A resistor R6 is connected with the gate of the switch Q4 and a source of the switch Q5 between the switches Q4, Q5 and the ground reference GND. A drain of the switch Q5 is connected with the cathode of the diode D2. Another leg of the circuit 4 includes resistors R9, R10 connected in series with each other between the terminal DA+ and the ground reference GND. The gate of the switch Q5 is connected with the resistors R9, R10 in a location that is between the resistors R9, R10.

A solid state semiconductor switch Q6 is located in another leg of the power supply circuit 4. The switch Q6 can include a bipolar transistor, such as an NPN bipolar transistor. A collector of the switch Q6 can be connected with the terminal DA+ such that the resistors R7, R8 are between the terminal DA+ and the collector of the switch Q6. The emitter of the switch Q6 is connected with the ground reference GND and the terminal DA− in a location between the ground reference GND and the terminal DA−. The base of the switch Q6 is connected with an anode of a diode ZD2, such as a Zener diode, a resistor R11, and a capacitor C2 in a location between the diode ZD2, the resistor R11, and the capacitor C2. The cathode of the diode ZD2 is connected with the terminal DA+ and the resistors R7, R8, with the resistors R7, R8 located between the terminal DA+ and the cathode of the diode ZD2. The resistor R11 is connected with the anode of the diode ZD2, the terminal DA−, and the ground reference GND in a location between the anode of the diode ZD2, the terminal DA−, and the ground reference GND. The capacitor C2 is connected with the base of the switch Q6, the terminal DA−, and the ground reference GND in a location between the anode of the diode ZD2, the terminal DA−, and the ground reference GND.

Resistors R12, R13 are connected in a series with each other. The resistors R12, R13 are connected with the voltage regulator 43 and the cathode of the diode D2 in a location between the voltage regulator 43 and the cathode of the diode D2. The resistors R12, R13 also are connected with the terminal DA− and the ground reference GND in a location between the terminal DA− and the ground reference GND. A power storage capacitor C3 is in another leg of the circuit 4. The capacitor C3 is connected with the diode D2 and the voltage regulator 43 in a location between the cathode of the diode D2 and the voltage regulator 43. The capacitor C3 also is connected with the terminal DA− and the ground reference GND in a location between the terminal DA− and the ground reference GND. The voltage regulator 43 is connected with the diode D2 and an output terminal VDD. The output terminal VDD may be connected with the internal controller 5 shown in FIG. 1 in order to conduct current to the internal controller 5 to power the internal controller 5.

A diode D3 is connected with the gate of the switch Q1 and an overprotection terminal nOVP. This diode D3 may be referred to as a switching diode. The anode of the diode D3 may be connected with the terminal nOVP and the cathode of the diode D3 may be connected with the gate of the switch Q1. The terminal nOVP may be conductively coupled with the overvoltage protection circuit 7 shown in FIG. 1.

Resistors R18, R19 are connected in series with each other in another leg of the circuit 4. The resistors R18, R19 are connected with the voltage regulator 43, a controller terminal VDD, a reference terminal Vref, and the ground reference GND. The resistor R18 is connected in a location between the voltage regulator 43 and the controller terminal VDD. The reference terminal Vref is connected with the resistors R18, R19 in a location between the resistors R18, R19. The resistor R19 is disposed between the reference terminal Vref and the ground reference GND. A capacitor C4 is disposed in parallel with the resistor R19 between the reference terminal Vref and the ground reference GND. The reference terminal Vref and the controller terminal VDD may be conductively coupled with the internal controller 5.

The circuit 4 shown in FIG. 2 includes voltage comparators U1, U2. The comparators U1, U2 can include differential amplifiers that generate different output signals depending on the voltages received by the comparators U1, U2. The comparators U1, U2 include positive input terminals 200 and negative input terminals 202. The comparators U1, U2 also are connected with the terminal VDD to receive current from the terminal VDD and with the ground reference GND. The comparators U1, U2 include output terminals 204 through which output signals are conducted from the comparators U1, U2.

Resistors R16, R17 are in parallel to each other and connected with the negative input terminal 202 of the comparator U1. The resistor R16 also is connected with the negative terminal DA− and with the anode of the diode ZD1. The resistor R17 is connected with a switch voltage terminal Vsw and with the storage capacitor C1. The negative input terminal 200 of the comparator U1 is connected with an output terminal nSWEN.

A diode D4 is connected with the gate of the switch Q3 such that the anode of the diode D4 is connected with the gate. A resistor R14 is connected with the anode of the diode D4 and with the output terminal 204 of the comparator U2. The output terminal 204 of the comparator U1 is connected with the cathode of the diode D4. The output terminal 204 of the comparator U2 is connected with the resistors R14, R15 in a location that is between the resistors R14, R15. The positive input terminal 200 of the comparator U2 is connected with the resistors R12, R13 in a location that is between the resistors R12, R13. The negative input terminal 202 of the comparator U2 is connected with the reference terminal Vref and with the positive input terminal 200 of the comparator U1.

In operation, the bus 106 shown in FIG. 1 is energized by current being conducted along the bus 106. The rectifier 2 converts the current into a rectified direct current (DC) voltage (e.g., 9 volts to 22 volts or another range). This voltage is conducted into the terminals DA+, DA− of the power supply circuit 4 as input voltage. The switch Q1 closes or is closed, and a current source 41 (which includes the switch Q1 and the resistors R1, R2) delivers a designated current (e.g., 2 milliamp current or another amount) for a current balancing circuit 42. The current balancing circuit 42 includes the components of the power supply circuit 4 as shown in FIG. 2. This current is conducted to and charges the storage capacitor C3 via the diode D2 with the designated current (e.g., the full 2 milliamps). The storage capacitor C3 can continue to be charged with this current until the voltage stored in the storage capacitor C3 (e.g., the electric energy stored in the storage capacitor C3) reaches a predefined or designated upper threshold of an input voltage margin of the power supply circuit 43. This threshold may be an upper limit on the amount of current that the internal controller 5 can receive before damage to the internal controller 5 occurs.

Responsive to the energy stored in the storage capacitor C3 reaching at least the upper threshold, the comparator U2 generates a first output signal. For example, the storage capacitor C3 may not permit additional current to be conducted through the capacitor C3 and, as a result, current may bypass the capacitor C3 and be conducted through another leg of the circuit 4 to the positive input terminal 200 of the comparator U2, such as the leg that includes the resistors R12, R13. The voltage at the positive input terminal 200 of the comparator U2 is larger than the current input into the negative input terminal 202 of the comparator U2. As a result, the comparator U2 outputs a first logic (such as high logic H, or a first designated voltage) via the output terminal 204 of the comparator U2.

The comparator U1 also generates an output signal having the first logic (e.g., high logic H, or the first designated voltage) via the output terminal 204 of the comparator U1 during a time period that the power supply capacitor C1 is less than a designated threshold value (e.g., a designated voltage, such as a voltage needed to power the internal controller 5). The output signal from the comparator U2 is conducted through the resistor R14 to the switch Q3. This output biases the switch Q3 to its saturated region. This causes the current to be conducted to the switch Q2 via the resistors R4, R5 and drive the switch Q2 to its saturated region.

The current from the bus 106 (as rectified by the rectifier 2) is conducted to the power supply capacitor C1 via the switches Q1, Q2 and the diode D1. The power supply capacitor C1 stores voltage from this current, which remains no greater than a lower power supply buffer threshold limit of the power supply circuit 4. If the voltage on the power supply capacitor C1 decreases below this threshold limit, the output of the comparator U2 changes to a different logic, such as a low logic L or zero volts. This causes the switch Q3 to open and be cut off via the resistor R14, which also opens or cuts off the switch Q2. The current then is conducted to the storage capacitor C3 via the switch Q1, the resistor R1, and the diode D2. This sequence can continue until the accumulated energy in the power supply capacitor C1 reaches the upper designated limit, which causes the output signal of the comparator U1 to change to the low logic L. Changing the comparator U1 in this way disables (e.g., stops) accumulation of charge in the power supply capacitor C1 independently of the logic signal that is output by the other comparator U2. For example, the low logic that is output by the comparator U1 stops the charging of the power supply capacitor C1 regardless of whether the logic signal from the comparator U2 is a high or low logic. Current in the power supply circuit 4 is conducted through the resistor R3 and the diode ZD1 to compensate for the loss of the capacitor C1 no longer being charged with current to stabilize the accumulated energy in the capacitor C1. The current is conducted through the switch Q1, the resistor R1, and the diode D3 back into the storage capacitor C3 to further increase the reserved energy for the voltage regulator 43. The capacitor C3 may supply the charged energy to the voltage regulator 43, which can then be supplied to the internal controller 5 via the terminal VDD.

If an overvoltage situation on the bus 106 occurs, the rectified voltage from the rectifier 2 that is received between the terminals DA+, DA− increases. Responsive to this voltage increasing (e.g., the voltage increases above a designated overvoltage limit, such as 30 volts or another value), a protection portion of the circuit 4 is activated. For example, the current can be conducted through the resistors R7, R8, R11, and the diode ZD2 to place the switch Q6 into its saturated region. The voltage on the collector of the switch Q6 reduces to zero or approximately zero (e.g., decreases by 90%, 95%, 97%, 99%, or another amount) and pulls down the voltage on the gate of the switch Q1 via the resistor R2. This cuts off the current flowing on the switch Q1 and disables the receiver and transmitter circuitry 3 shown in FIG. 1 via the diode D3. The circuit 4 can remain in this state to withstand long lasting or permanent overvoltage situations. Responsive to the voltage on the bus 106 returning to normal status (e.g., reducing to no more than the designated overvoltage limit), the circuit 4 returns to operating as described above.

Figure 3:
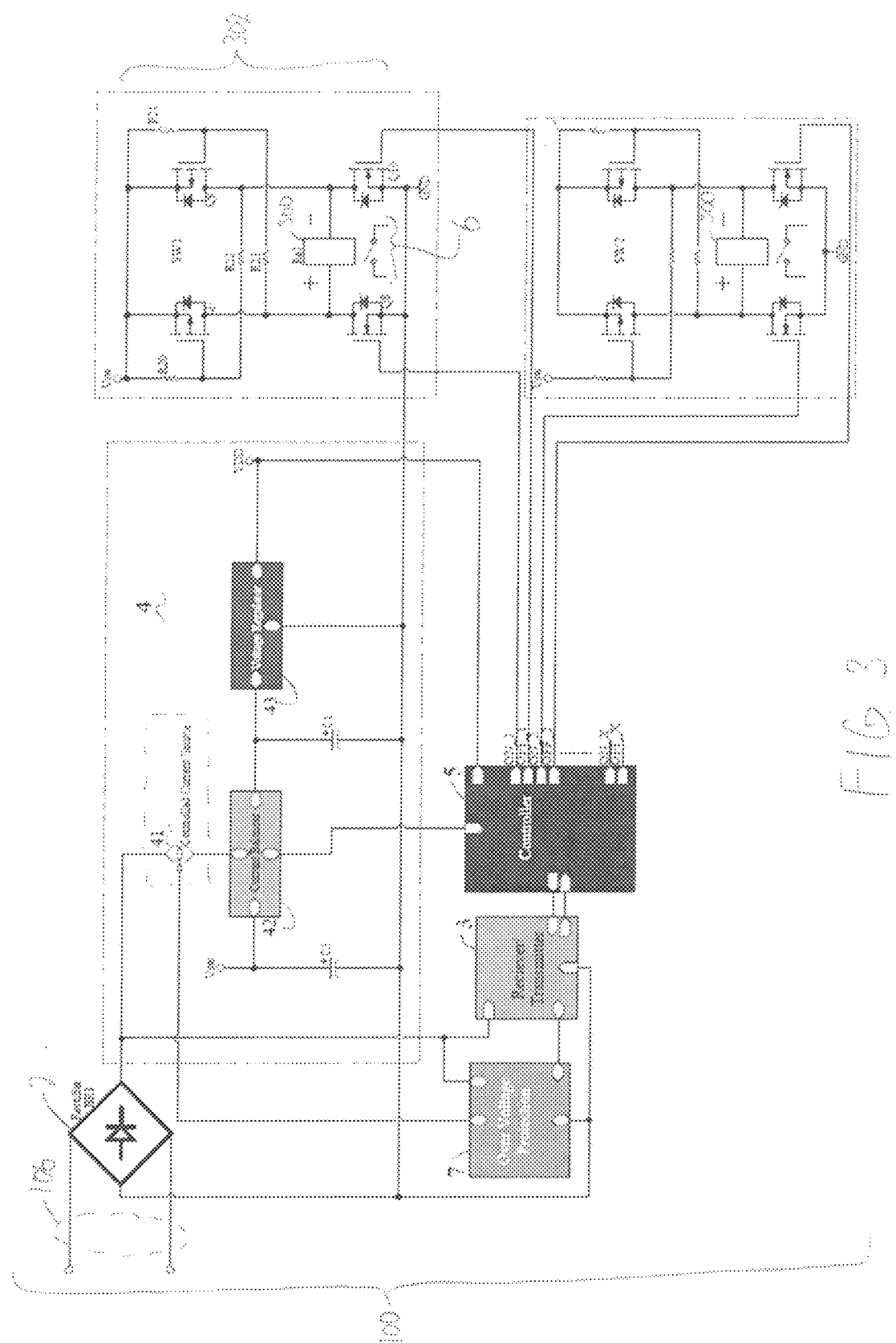
FIG. 3 illustrates another circuit diagram of the lighting system shown in FIG. 1.

FIG. 3 illustrates another circuit diagram of the lighting system 100 shown in FIG. 1. As shown in FIG. 3, the internal controller 5 can include several switch control terminals ON_1, OFF_1, ON_2, OFF_2, ON_X, OFF_X. These switch control terminals are conductively coupled with switch driver circuitry 302 to change the state of the switches 6. The driver circuitry 302 controls relays 300 that are energized or de-energized by the controller 5 and the power supply circuit 3 to open or close contacts of the switches 6. The closing of the contacts of the switches 6 allows current to flow to the higher power devices or switch loads 110 shown in FIG. 1, while the opening of the contacts of the switches 6 prevents current from flowing to the higher power devices or switch loads 110.

A voltage signal can be conducted to a first switch 6 ("SW1" in FIG. 3) via the terminal ON_1 to turn the first switch 6 on (e.g., close the first switch 6), a voltage signal can be conducted to the first switch 6 via the terminal OFF_1 to turn the first switch 6 off (e.g., open the first switch 6), a voltage signal can be conducted to a second switch 6 ("SW2" in FIG. 3) via the terminal ON_2 to turn the second switch 6 on (e.g., close the second switch 6), a voltage signal can be conducted to the second switch 6 via the terminal OFF_2 to turn the second switch 6 off (e.g., open the second switch 6), and so on. Additional switches 6 can be connected with additional terminals, as represented by the terminals ON_X, OFF_X. The terminals that conduct the signals to turn the switches on or close the switches 6 are referred to as switch activation terminals while the terminals that conduct the signals to turn the switches off or open the switches 6 are referred to as switch deactivation terminals.

The switch activation terminals are conductively coupled with gates of solid state semiconductor switches Q8, such as nMOSFET or a high voltage depletion type nMOSFET. The sources of the switches Q8 are connected with a ground reference GND. The drains of the switches Q8 are connected with positive terminals of relay solenoids 300 ("Rel" in FIG. 3). The sources of the switches Q8 are connected with gates of solid state semiconductor switches Q9 by resistors R23. The switches Q9 can represent n-type MOSFETs in one embodiment. Drains of the switches Q9 are connected with the terminal Vsw of the power supply circuit 4 and with drains of solid state semiconductor switches Q7, which can represent n-type MOSFETs. Gates of the switches Q7, Q9 are coupled with the terminal Vsw by resistors R20, R21, respectively. Sources of the switches Q7 are connected with the positive terminals of the relays 300. Sources of the switches Q9 are connected with negative terminals of the relays 300. Resistors R22 are connected between gates of the switches Q7 and the negative terminals of the relays 300. Resistors R23 are connected between drains of the switches Q8 and the gates of the switches Q9. Solid state semiconductor switches Q10, which can represent nMOSFETs or high voltage depletion type nMOSFETs, have sources that are connected with the ground reference GND, gates that are connected with the switch deactivation terminals of the internal controller 5, and drains that are connected with the negative terminals of the relays 300.

In operation, the internal controller 5 receives a control signal from the controller 102 (shown in FIG. 1) via the receiver and transmitter circuitry 3 to close one or more of the switches 6. Responsive to receiving such a control signal, the controller 5 examines the voltage present on the terminal nSWEN. If the voltage on this terminal nSWEN is at a low logic (e.g., no or very little voltage), then this voltage indicates that there is sufficient energy stored in the power supply capacitor C1 to change the state of the switches 6. The controller 5 may then apply a switch signal to the appropriate terminal (e.g., by applying a voltage that corresponds to a high logic H or a designated, non-zero voltage). For example, if the controller 5 is to activate the first switch 6 by closing the first switch 6, the controller 5 can apply a designated voltage representative of the high logic H to the terminal ON_1 while applying no voltage or a different designated voltage representative of the low logic L on the terminal OFF_1. If the controller 5 is to deactivate the first switch 6 by opening the first switch 6, the controller 5 can apply a designated voltage representative of the high logic H to the terminal OFF_1 while applying no voltage or a different designated voltage representative of the low logic L on the terminal ON_1. The controller 5 can apply similar voltages to other switch activation terminals and/or switch deactivation terminals to appropriately control the other switches 6.

Applying the designated voltage on the switch activation terminal causes the switch Q8 in the corresponding switch 6 to become saturated and connect (e.g., pull) the positive terminal of the relay 300 and the gate of the switch Q9 to the ground reference GND. This causes the switch Q9 to go into its saturation region and connect the negative terminal of the relay 300 with the terminal Vsw. A positive voltage may be applied to the terminal Vsw by the capacitor C1, which is conducted to the relay 300 to cause the relay 300 to close the contacts of the switch 6.

Applying the designated voltage on the switch deactivation terminal causes the switch Q10 in the corresponding switch 6 to become saturated and connect (e.g., pull) the negative terminal of the relay 300 and the gate of the switch Q7 to the ground reference GND. This causes the switch Q7 to go into its saturation region and connect the positive terminal of the relay 300 with the terminal Vsw. A positive voltage may be applied to the terminal Vsw by the capacitor C1, which is conducted to the relay 300 to cause the relay 300 to open the contacts of the switch 6.

The switches Q7, Q8, Q9, Q10 in the driver circuitry 302 have low channel resistance when saturated. The total channel resistance of the pathway used to activate the relay 300 (e.g., the pathway that passes through the switches Q8, Q9) and the total channel resistance of the pathway used to deactivate the relay 300 (e.g., the pathway that passes through the switches Q7, Q10) may be less than 10% (or another value) of the DC resistance of the relay 300, thereby ensuring that most (e.g., at least 80%, at least 85%, at least 90%, etc.) of the energy stored in the capacitor C1 is used to activate or deactivate the relay 300.

In the event that the power supply capacitor C1 has insufficient energy stored in the capacitor C1 to change the state of a switch 6, the power storage capacitor C3 can provide the additional energy needed to change the state of the switch 6. The capacitor C3 can conduct the needed voltage to the controller 5 via the terminal VDD or another terminal.

In one embodiment, the controller 5 may include a memory, such as a computer readable storage medium (e.g., a nonvolatile memory, such as read-only memory, flash memory, ferroelectric random access memory, hard disk drive, floppy disk, magnetic tape, etc.). The controller 5 can store the states of the switches 6 in the memory for later retrieval. For example, the open or closed state of each switch 6 can be stored in this memory and, in the event of a power failure or loss, the controller 5 can examine the memory to determine which switches 6 are open and which switches 6 are closed.

One or more embodiments of the power handling system 108 described herein can be used with DALI type lighting systems to independently connect and disconnect two or more heavy electric loads (e.g. lamps, fans, refrigerators, or other appliances) to the mains voltage rails (e.g., the bus 106) of the DALI systems. The control signals used to control the switches 6 that activate or deactivate the heavy loads are overcurrent limited and overvoltage protected. The power consumed by the power handling system 108 is relatively small and may stay within the range of current conducted in the DALI bus 106 to control other light devices, such as 2 milliamps or less.

Figure 4:
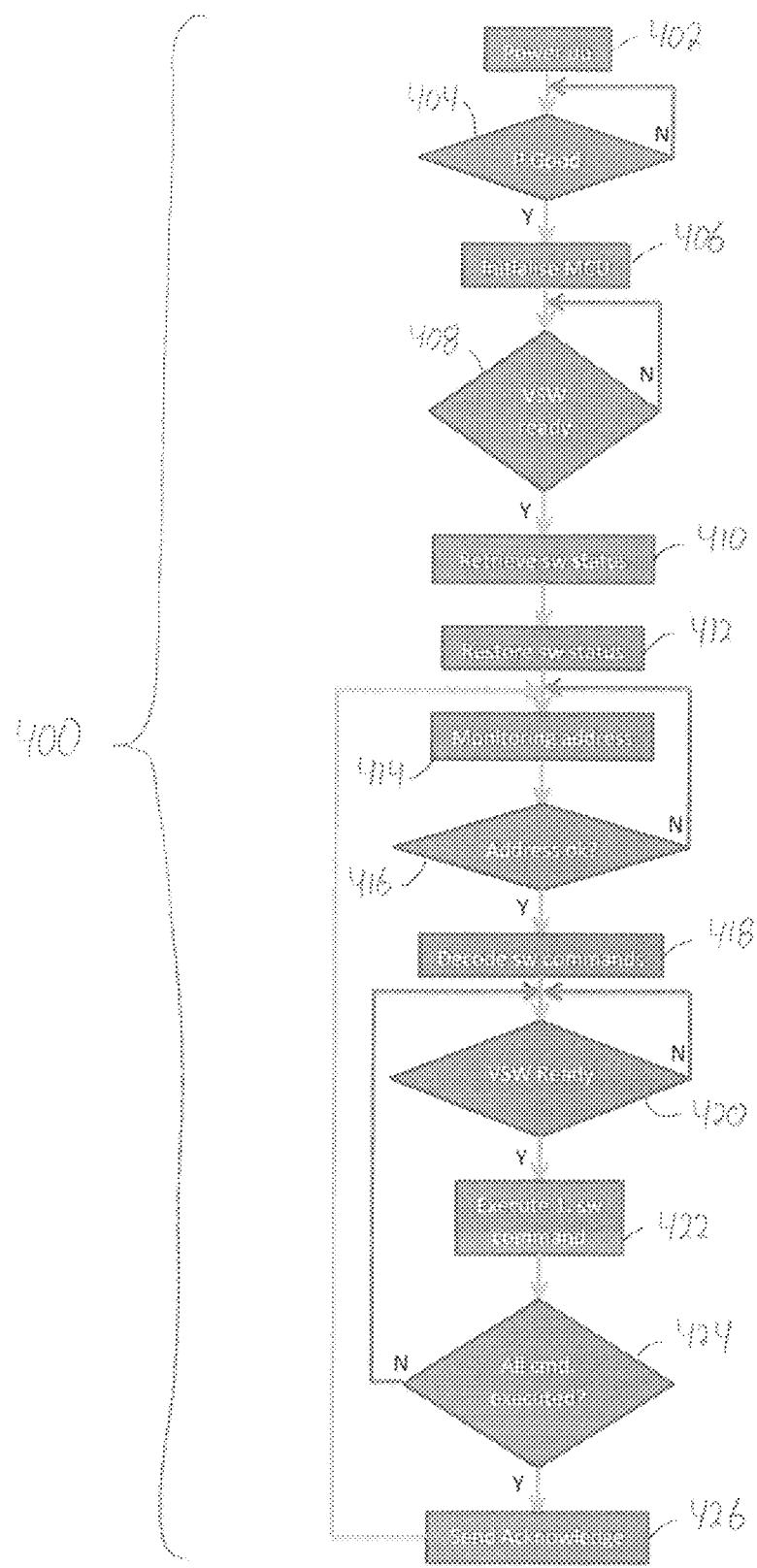
FIG. 4 illustrates a flowchart of one embodiment of a method for controlling heavier electric loads in a lighting system, such as a DALI lighting system.

FIG. 4 illustrates a flowchart of one embodiment of a method 400 for controlling heavier electric loads in a lighting system, such as a DALI lighting system. The method 400 may be performed by one or more embodiments of the power handling system 108 shown and described herein. At 402, the handling system 108 is powered up. For example, the handling system 108 may receive current into a rectifier from mains voltage rails or bus 106 of the lighting system. At 404, a determination is made as to whether sufficient electric power has been received from the bus. For example, the power handling system 108 may determine whether the power supply capacitor C1 and/or the power storage capacitor C3 have sufficient energy stored in the capacitor C1 and/or the capacitor C3 to power the internal controller 5 to change the state of one or more switches 6. If the power handling system 108 has been powered for a sufficiently long period of time to charge the capacitors C1 and/or C3 with sufficient energy, then flow of the method 400 may continue toward 406. But, if the power handling system 108 has not been powered for a sufficiently long period of time to charge the capacitors C1 and/or C3 with sufficient energy, then flow of the method 400 may delay until sufficient energy has been stored in the capacitors C1 and/or C3.

At 406, the internal controller 5 is initialized. The controller 5 can be initialized by activating or turning the controller 5 on by powering the controller 5 with at least some of the energy stored in the capacitor C1 and/or C3. At 408, a determination is made as to whether the power handling system 108 has sufficient energy to provide to the controller 5 to change the state of one or more of the switches 6. For example, the voltage present on the terminal Vsw may be examined by the controller to determine whether the voltage is sufficiently large to change the state of one or more relays 300 in the switches 6. The controller 5 may make this determination by comparing the voltage on the terminal Vsw with a designated, non-zero voltage threshold representative of the energy needed to change the state of a relay 300. If the voltage on the terminal Vsw is less than this threshold, then there may not be sufficient energy to change the state of a switch 6, and the method 400 may delay until the voltage on the terminal Vsw is at least as large as the threshold. If the voltage on the terminal Vsw is not less than this threshold, then there may be sufficient energy to change the state of a switch 6, and the method 400 may proceed toward 410.

At 410, the states or statuses of the switches 6 are determined. In one embodiment, the controller 5 may examine the states of the switches 6 as stored in a memory of the controller 5 or a memory that is external to the controller 5. Alternatively, the method 400 may not include the operations described in connection with 410.

At 412, the states or statuses of the switches 6 are restored. For example, the controller 5 may apply voltages from the capacitor C1 and/or C2 to the switch activation terminals connected with the switches 6 that are to be in the closed state and apply voltages from the capacitor C1 and/or C2 to the switch deactivation terminals connected with the switches 6 that are to be in the open state. The states of the switches 6 may be restored based on the states of the switches 6 obtained from the memory. Alternatively, the method 400 may not include the operations described in connection with 410 and/or 412.

At 414, an address is monitored for control signals. For example, the internal controller 5 may be associated with a network address in the DALI lighting system on the bus 106. The controller 102 of the lighting system can communicate control signals to the internal controller 5 along the bus 106 to connect or disconnect different ones of the heavy loads 110 by closing or opening one or more switches 6. The receiver and transmitter circuitry 3 and/or internal controller 5 may examine the signals received on the bus 106 to determine if the signals include any such control signals.

At 416, a determination is made as to whether any control signal to open or close a switch has been received at the address. If a signal is received, then flow of the method 400 may proceed toward 418. If no signal is received, then flow of the method 400 may return toward 414 to continue monitoring the bus 106 for a control signal.

At 418, the control signal is examined to identify or decode instructions or commands for changing the state of one or more switches 6. At 420, the voltage on the switch terminal Vsw is examined to determine if there is sufficient voltage to change a state of one or more of the relays 300 in the switches 6. The internal controller 5 can make this determination. If there is sufficient voltage, then flow of the method 400 can proceed toward 422. Otherwise, flow of the method 400 can return toward 420 or delay until sufficient voltage is accumulated on the terminal Vsw.

At 422, the command or instruction to change a state of one or more of the switches 6 is executed. For example, the controller 5 can conduct the voltage to the switch activation terminal of the switches 6 that are to be turned to the closed state by the control signal and/or can conduct the voltage to the switch deactivation terminal of the switches 6 that are to be turned to the open state by the control signal. At 424, a determination is made as to whether all commands received by the control signal have been executed. The control signal may instruct the controller 5 to change the state of several switches 6. The controller 5 can determine whether the states of all switches instructed to be changed by the control signal were changed at 424. If one or more switches still need to be changed from open to closed states or from closed to open states, then flow of the method 400 can return toward 420 to change the state of the remaining switch(es). Otherwise, flow of the method 400 can proceed toward 426.

At 426, an acknowledgement signal is sent to the controller. For example, the internal controller 5 may direct the receiver and transmitter circuitry 3 to conduct a signal to the controller 102 via the bus 106 to notify the controller 102 that the states of the switches 6 have been changed as directed by the control signal from the controller 102.

In one embodiment, a power handling system includes a controller and a power supply circuit. The controller is configured to control one or more switches connected with a bus of a digitally addressable lighting interface (DALI) system that supplies an electric current to one or more lower power light sources, the controller configured to close the one or more switches to activate and/or deactivate one or more higher power devices (or to conduct at least some of the current conducted on the bus of the DALI system to the higher power devices). The power supply circuit is operably coupled with the controller and the bus of the DALI system. The power supply circuit includes a power supply capacitor and is configured to receive at least part of the current conducted on the bus to the one or more lower power light sources. The power supply circuit also is configured to conduct at least part of the current to the power supply capacitor. The power supply circuit also is configured to store electric energy of the at least part of the current in the power supply capacitor until the power supply capacitor stores at least a designated upper threshold of input voltage of the controller. The power supply capacitor is configured to discharge at least some of the electric energy that is stored in the power supply capacitor into the controller to power the controller to close the one or more switches using at least some of the electric energy stored in the power supply capacitor responsive to the power supply capacitor storing at least the designated upper threshold of the input voltage of the controller. In one aspect, the higher power loads can be powered by current conducted along a different, separate bus than the control bus, such as by current conducted via one or more wires from a utility grid, batteries, etc., that provide 110 volts/230 volts AC current (or another current).

In one aspect, the power supply capacitor of the power supply circuit is charged with the same current as is conducted on the bus to the one or more lower power light source drivers.

In one aspect, the power supply circuit includes a first voltage comparator, a first semiconductor switch, and a storage capacitor operably coupled with the power supply capacitor. The first voltage comparator is configured to conduct a logic signal that closes the first semiconductor switch to conduct the current to the storage capacitor for storage as electric energy in the storage capacitor.

In one aspect, the power supply circuit includes a second semiconductor switch configured to close and conduct the current to the storage capacitor instead of conducting the current to the power supply capacitor responsive to the first voltage comparator conducting the logic signal and the first semiconductor switch closing.

In one aspect, responsive to the voltage on the power supply capacitor decreasing below a designated lower threshold, the first voltage comparator stops generating the logic signal and/or changes the logic signal to open the second semiconductor switch to direct the current back to the power supply capacitor instead of the storage capacitor.

In one aspect, the power handling system also includes a receiver and transmitter circuit operably coupled with the controller and the bus. The receiver and transmitter circuit is configured to communicate a control signal received via the bus to the controller to control the one or more switches.

In one aspect, the power supply circuit includes a first semiconductor switch and a bipolar transistor operably coupled with the power supply capacitor. Responsive to the voltage presented on the bus increasing above a designated upper threshold, the power supply circuit is configured to conduct the current to the bipolar transistor that cuts off conduction of the current to the first semiconductor switch to open the first semiconductor switch and prevent the current from being conducted to the internal controller, receiver and transmitter circuitry.

In one aspect, the power supply circuit includes a storage capacitor configured to store electric energy of the current. Responsive to the current decreasing to no more than the designated upper threshold, the power supply circuit is configured to conduct the current to close the first semiconductor switch to conduct the current to the storage capacitor for storage as the electric energy in the storage capacitor.

In one aspect, responsive to the controller receiving a control signal via the bus, the controller is configured to examine the electric energy that is stored in the power supply capacitor and generate a switch signal that one or more of opens or closes the one or more switches.

In one embodiment, a method includes receiving a current conducted along a bus of a digitally addressable lighting interface (DALI) system that supplies the current to one or more lower power light sources drivers. The current is received by a power supply circuit. The method also includes conducting at least part of the current conducted on the bus to a power supply capacitor of the power supply circuit, storing electric energy of the at least part of the current in the power supply capacitor until the power supply capacitor stores at least a designated upper threshold of input voltage of the controller, and, responsive to the power supply capacitor storing at least the designated upper threshold of the input voltage of the controller, discharging at least some of the electric energy that is stored in the power supply capacitor into a controller to power the controller and cause the controller to close one or more switches connected with one or more higher power devices to activate the higher power devices with the current conducted on the bus.

In one aspect, storing the electric energy includes charging the power supply capacitor with the same current as is conducted on the bus to the one or more lower power light source drivers.

In one aspect, the method also can include conducting a logic signal from a first voltage comparator of the power supply circuit to a first semiconductor switch of the power supply circuit to close the first semiconductor switch and conduct the current to a storage capacitor of the power supply circuit for storage as electric energy in the storage capacitor.

In one aspect, the method also can include closing a second semiconductor switch of the power supply circuit to conduct the current to the storage capacitor instead of conducting the current to the power supply capacitor responsive to the first voltage comparator conducting the logic signal and the first semiconductor switch closing.

In one aspect, the method also can include, responsive to the current conducted on the bus decreasing below a designated lower threshold, one or more of stopping generation of the logic signal or changing the logic signal by the first voltage comparator to open the second semiconductor switch and direct the current back to the power supply capacitor instead of the storage capacitor.

In one aspect, the method can include communicating a control signal received at a receiver and transmitter circuit operably coupled with the controller and the bus to the controller to control the one or more switches.

In one aspect, the method can include, responsive to the voltage presented on the bus increasing above a designated upper threshold, conducting the current to a bipolar transistor of the power supply circuit to cut off conduction of the current to a first semiconductor switch of the power supply circuit to open the first semiconductor switch and prevent the current from being conducted to the internal controller, receiver and transmitter circuitry.

In one aspect, the method can include, responsive to the current decreasing to no more than the designated upper threshold, conducting the current to close the first semiconductor switch of the power supply circuit to conduct the current to a storage capacitor of the power supply circuit for storage as the electric energy in the storage capacitor.

In one aspect, the method can include, responsive to the controller receiving a control signal via the bus, examining the electric energy that is stored in the power supply capacitor with the controller and generating a switch signal with the controller that one or more of opens or closes the one or more switches.

In one embodiment, a DALI power handling system includes a rectifier configured to be operably coupled with a bus of a DALI lighting system that supplies an electric current to one or more light source drivers, a receiver and transmitter circuit configured to be operably coupled with the rectifier to receive a control signal conducted along the bus of the DALI lighting system, a controller (e.g., an internal controller), and a power supply circuit. The controller is configured to be operably coupled with the receiver and transmitter circuit. The controller can be configured to control one or more switches to conduct at least some of the current conducted on the bus to one or more devices that operate on greater loads than the one or more light source drivers. The power supply circuit is configured to be operably coupled with the controller and the rectifier. The power supply circuit can be configured to receive at least part of the current conducted on the bus and to store electric energy based on the at least part of the current that is received by the power supply circuit. The power supply circuit can be configured to discharge at least some of the electric energy that is stored in the power supply circuit into the controller to power the controller to change a state of the one or more switches.

In one aspect, the power supply circuit is charged with the same current as is conducted on the bus to the one or more light source drivers.

In one aspect, the power supply circuit includes a semiconductor switch and a bipolar transistor. The power supply circuit can be configured to, responsive to the voltage presented on the bus increasing above a designated upper threshold, conduct the current to the bipolar transistor that cuts off conduction of the current to the first semiconductor switch to open the first semiconductor switch and prevent the current from being conducted to the internal controller, receiver and transmitter circuitry.

In one aspect, the power supply circuit includes a storage capacitor configured to store electric energy of the current. Responsive to the current conducted on the bus decreasing to no more than the designated upper threshold, the power supply circuit is configured to conduct the current to the storage capacitor for storage as the electric energy in the storage capacitor.

As used herein, an element or step recited in the singular and proceeded with the word "a" or "an" should be understood as not excluding plural of said elements or steps, unless such exclusion is explicitly stated. Furthermore, references to "one embodiment" of the present inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

The foregoing description of certain embodiments of the present inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be standalone programs, may be incorporated as subroutines in an operating system, may be functions in an installed software package, and the like. The various embodiments are not limited to the arrangements and instrumentality shown in the drawings.

This written description uses examples to disclose several embodiments of the inventive subject matter and also to enable one of ordinary skill in the art to practice the embodiments of inventive subject matter, including making and using any devices or systems and performing any incorporated methods. The patentable scope of the inventive subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A switching assembly comprising:
   a controller configured to control one or more switches connected with a control bus of a digitally addressable lighting interface (DALI) system that supplies an electric current to one or more lower power light sources, the controller configured to close the one or more switches to activate or deactivate one or more higher power devices; and
   a power supply circuit operably coupled with the controller and the bus of the DALI system, the power supply circuit including a power supply capacitor and configured to receive at least part of the current conducted on the bus to the one or more lower power light sources and to conduct the at least part of the current to the power supply capacitor, the power supply circuit configured to store electric energy of the at least part of the current in the power supply capacitor until the power supply capacitor stores at least a designated upper threshold of input voltage of the controller,
   wherein the power supply capacitor is configured to discharge at least some of the electric energy that is stored in the power supply capacitor into the controller to power the controller to change a state of the one or more switches using at least some of the electric energy stored in the power supply capacitor responsive to the power supply capacitor storing at least the designated upper threshold of the input voltage of the controller.

2. The switching assembly of claim 1, wherein the power supply capacitor of the power supply circuit is charged with the same current as is conducted on the bus to the one or more lower power light source drivers.

3. The switching assembly of claim 1, wherein the power supply circuit includes a first voltage comparator, a first semiconductor switch, and a storage capacitor operably coupled with the power supply capacitor, the first voltage comparator configured to conduct a logic signal that closes the first semiconductor switch to conduct the current to the storage capacitor for storage as electric energy in the storage capacitor.

4. The switching assembly of claim 3, wherein the power supply circuit includes a second semiconductor switch configured to close and conduct the current to the storage capacitor instead of conducting the current to the power supply capacitor responsive to the first voltage comparator conducting the logic signal and the first semiconductor switch closing.

5. The switching assembly of claim 3, wherein, responsive to the voltage on the power supply capacitor decreasing below a designated lower threshold, the first voltage comparator one or more of stops generating the logic signal or changes the logic signal to open the second semiconductor switch to direct the current back to the power supply capacitor instead of the storage capacitor.

6. The switching assembly of claim 1, further comprising a receiver and transmitter circuit operably coupled with the controller and the bus, the receiver and transmitter circuit configured to communicate a control signal received via the bus to the controller to control the one or more switches.

7. The switching assembly of claim 6, wherein the power supply circuit includes a first semiconductor switch and a bipolar transistor operably coupled with the power supply capacitor, wherein, responsive to the voltage presented on the bus increasing above a designated upper threshold, the power supply circuit is configured to conduct the current to the bipolar transistor that cuts off conduction of the current to the first semiconductor switch to open the first semiconductor switch and prevent the current from being conducted to the internal controller, receiver and transmitter circuitry.

8. The switching assembly of claim 7, wherein the power supply circuit includes a storage capacitor configured to store electric energy of the current, wherein, responsive to the current decreasing to no more than the designated upper threshold, the power supply circuit is configured to conduct the current to close the first semiconductor switch to conduct the current to the storage capacitor for storage as the electric energy in the storage capacitor.

9. The switching assembly of claim 1, wherein, responsive to the controller receiving a control signal via the bus, the controller is configured to examine the electric energy that is stored in the power supply capacitor and generate a switch signal that one or more of opens or closes the one or more switches.

10. A method comprising:
    receiving a current conducted along a bus of a digitally addressable lighting interface (DALI) system that supplies the current to one or more lower power light sources drivers, the current received by a power supply circuit;
    conducting at least part of the current conducted on the bus to a power supply capacitor of the power supply circuit;
    storing electric energy of the at least part of the current in the power supply capacitor until the power supply capacitor stores at least a designated upper threshold of input voltage of the controller; and
    responsive to the power supply capacitor storing at least the designated upper threshold of the input voltage of the controller, discharging at least some of the electric energy that is stored in the power supply capacitor into a controller to power the controller and cause the controller to change a state of one or more switches connected with one or more higher power devices to activate the higher power devices with the current conducted on the bus.

11. The method of claim 10, wherein storing the electric energy includes charging the power supply capacitor with the same current as is conducted on the bus to the one or more lower power light source drivers.

12. The method of claim 10, further comprising conducting a logic signal from a first voltage comparator of the power supply circuit to a first semiconductor switch of the power supply circuit to close the first semiconductor switch and conduct the current to a storage capacitor of the power supply circuit for storage as electric energy in the storage capacitor.

13. The method of claim 12, further comprising closing a second semiconductor switch of the power supply circuit to conduct the current to the storage capacitor instead of conducting the current to the power supply capacitor responsive to the first voltage comparator conducting the logic signal and the first semiconductor switch closing.

14. The method of claim 12, further comprising, responsive to the current conducted on the bus decreasing below a designated lower threshold, one or more of stopping generation of the logic signal or changing the logic signal by the first voltage comparator to open the second semiconductor switch and direct the current back to the power supply capacitor instead of the storage capacitor.

15. The method of claim 10, further comprising communicating a control signal received at a receiver and transmitter circuit operably coupled with the controller and the bus to the controller to control the one or more switches.

16. The method of claim 15, further comprising, responsive to the voltage presented on the bus increasing above a designated upper threshold, conducting the current to a bipolar transistor of the power supply circuit to cut off conduction of the current to a first semiconductor switch of the power supply circuit to open the first semiconductor switch and prevent the current from being conducted to the internal controller, receiver and transmitter circuitry.

17. The method of claim 15, further comprising, responsive to the current decreasing to no more than the designated upper threshold, conducting the current to close the first semiconductor switch of the power supply circuit to conduct the current to a storage capacitor of the power supply circuit for storage as the electric energy in the storage capacitor.

18. The method of claim 10, further comprising, responsive to the controller receiving a control signal via the bus, examining the electric energy that is stored in the power supply capacitor with the controller and generating a switch signal with the controller that one or more of opens or closes the one or more switches.

19. A digitally addressable lighting interface (DALI) power handling system comprising:
   a rectifier configured to be operably coupled with a bus of a DALI lighting system that supplies an electric current to one or more light source drivers;
   a receiver and transmitter circuit configured to be operably coupled with the rectifier to receive a control signal conducted along the bus of the DALI lighting system;
   a controller configured to be operably coupled with the receiver and transmitter circuit, the controller configured to control one or more switches to conduct at least some of the current conducted on the bus to one or more devices that operate on greater loads than the one or more light source drivers; and
   a power supply circuit configured to be operably coupled with the controller and the rectifier, the power supply circuit configured to receive at least part of the current conducted on the bus and to store electric energy based on the at least part of the current that is received by the power supply circuit,
   wherein the power supply circuit is configured to discharge at least some of the electric energy that is stored in the power supply circuit into the controller to power the controller to change a state of the one or more switches.

20. The DALI power handling system of claim 19, wherein the power supply circuit is charged with the same current as is conducted on the bus to the one or more light source drivers.

* * * * *